United States Patent [19]

Litscher

[11] Patent Number: 5,582,057

[45] Date of Patent: Dec. 10, 1996

[54] METHOD FOR FORMING AN EXPANSION SLEEVE FOR AN EXPANSION DOWEL

[75] Inventor: Walter Litscher, Nendeln, Liechtenstein

[73] Assignee: Hilti Aktiengesellschaft, Schaan, Liechtenstein

[21] Appl. No.: 362,099

[22] Filed: Dec. 20, 1994

[30] Foreign Application Priority Data

Dec. 24, 1993 [DE] Germany ............. 43 44 382.6

[51] Int. Cl.$^6$ ............................................. B21D 31/06
[52] U.S. Cl. ......................... 72/325; 72/377; 72/356
[58] Field of Search ........................ 72/325, 355.6, 72/356, 377; 470/21, 29, 14, 2

[56] References Cited

U.S. PATENT DOCUMENTS

| 61,756 | 2/1867 | Myers | 72/325 |
|---|---|---|---|
| 1,394,123 | 10/1921 | Sibley | 470/29 |
| 1,469,977 | 10/1923 | Weaver | 470/29 |
| 2,289,516 | 7/1942 | McCullough | 470/14 |
| 2,762,119 | 9/1956 | Jackson | 72/377 |
| 4,520,521 | 6/1985 | Miyake | 72/377 |
| 4,653,132 | 3/1987 | Yamada | 470/14 |

FOREIGN PATENT DOCUMENTS

| 209738 | 12/1982 | Japan | 470/21 |
|---|---|---|---|
| 768261 | 2/1957 | United Kingdom | 72/325 |

*Primary Examiner*—Daniel C. Crane
*Attorney, Agent, or Firm*—Anderson, Kill & Olick P.C.

[57] ABSTRACT

An expansion sleeve (2) for an expansion dowel (1) has an axially extending expansion region (8) with axially extending slots (5) forming tabs between these slots. To enlarge the surface of the expansion sleeve (2) for assuring the attainment of high anchoring values, the axially extending slots (5) are formed free of any gaps. The gap-free slots (5) can be formed by extrusion including radially pressing together the tabs between the slots (5).

5 Claims, 2 Drawing Sheets

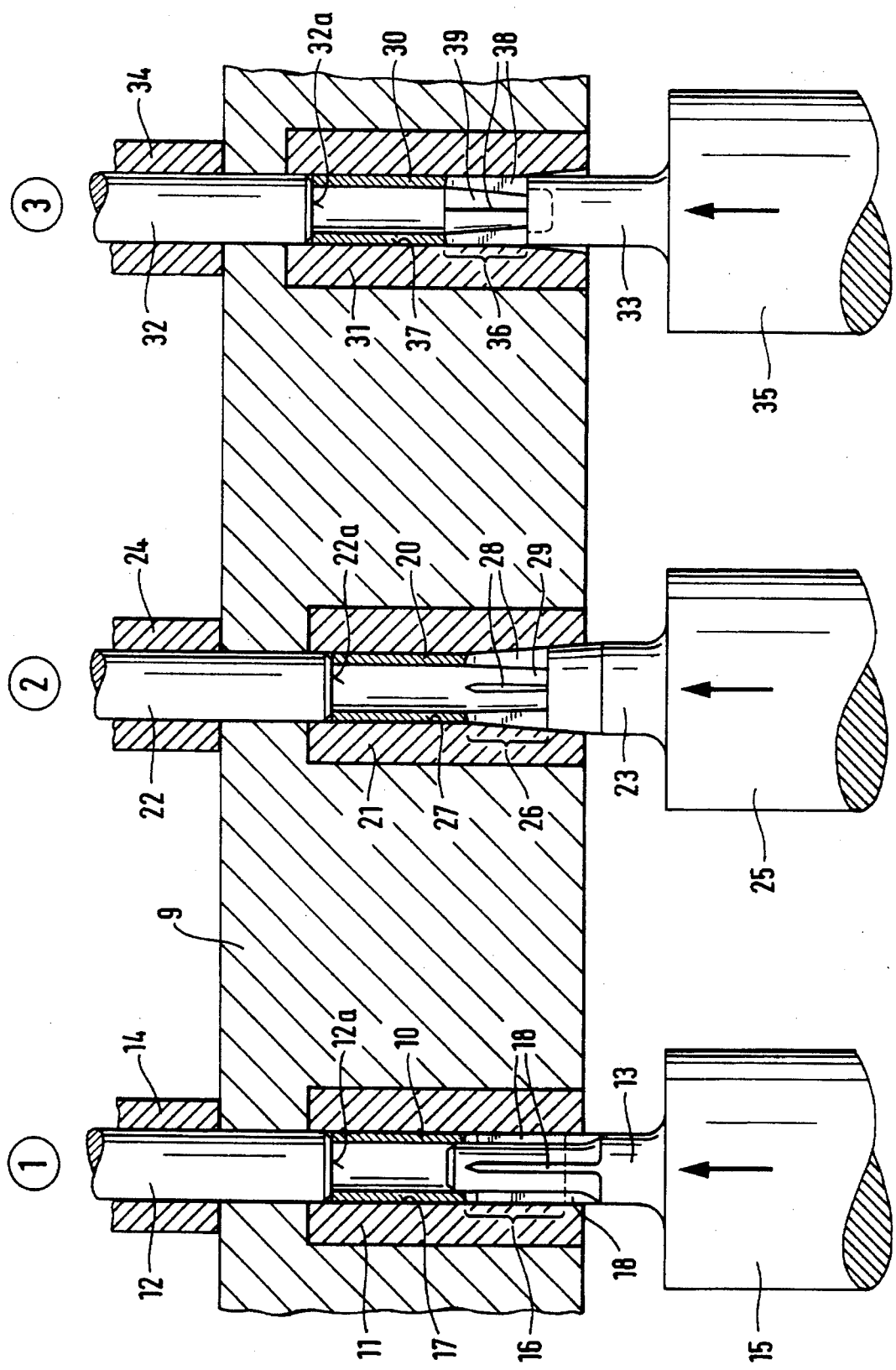

1

METHOD FOR FORMING AN EXPANSION SLEEVE FOR AN EXPANSION DOWEL

BACKGROUND OF THE INVENTION

The present invention is directed to a method of forming expansion dowels with at least an axially extending expansion region provided with axially extending slots and a bore tapering inwardly in the expansion region towards a leading end of the dowel.

Expansion dowels of this general type are anchored in a foundation, such as concrete, rock, masonry and the like by radially widening an expansion sleeve. Such radial widening determines the anchoring values to be achieved, since a connection is created between the expansion sleeve and the foundation affording on one hand a frictional lock and in certain cases a positive locking feature. The extent of a frictionally locked connection is in particular influenced by the amount of the surface available for this purpose on the expansion sleeve, that is, a small surface on the expansion sleeve available for friction locking affords lower anchoring values.

An expansion dowel is known from DE-PS 21 52 729 having a radially widenable expansion sleeve. The expansion region of the expansion sleeve has axially extending slots for affording the radial widening with tabs formed between the slots. The expansion sleeve is radially widened by driving an expansion member into the bore in the expansion sleeve which tapers inwardly toward its leading end, so that the tabs move radially outwardly. After the radial widening has occurred, that is, when the expansion dowel has been completely set, a member, such as a bolt, a threaded rod or the like can be fastened in the trailing end of the expansion sleeve by load engaging means in the shape of a thread located at the trailing end directed away from the expansion region.

The above-mentioned known expansion dowel can be provided with four axially extending slots. These slots are formed by a machine cutting operation so that they have a specific width transversely of the axial direction, depending on the tool used, such as the side milling cutter. Since the width of the axially extending slots depends on the width of the removing tool used, for economic reasons the width of the slots is the same for all sizes of expansion dowels. As a result, a considerable share of the surface of the expansion dowel is consumed by the axially extending slots, particularly in the case of smaller diameter expansion dowels. Such share of the surface is not available for affording the connection with the foundation, whereby the achievable anchoring values are reduced. Therefore, with smaller diameter expansion dowels, the share of the surface available for providing a connection with the foundation is reduced by up to 20%. This situation is further exacerbated, since in the radial expansion step the axially extending slots are widened.

SUMMARY OF THE INVENTION

Therefore, it is a primary object of the present invention to provide a method of forming expansion dowels which results in high anchoring values.

In accordance with the present invention, initially the axially extending slots are formed after which the slots are closed largely by pressing together tabs formed between the slots in the expansion sleeve.

The originally produced axially extending slots are closed for the most part due to the radially pressing together of the tabs of the expansion sleeve formed between the axially extending slots, as proposed in the invention. For purposes of the invention slot widths in the range of 0 to 0.2 mm are considered to be closed. In addition to closing the axially extending slots and the resulting enlargement of the surface of the expansion section of the sleeve, the shape of the bore within the sleeve tapering inwardly toward the leading end is created when the tabs are radially pressed together.

The material of the expansion sleeve required for forming the tapering bore can be obtained according to another feature of the invention when the expansion sleeve is first radially widened and then the axially extending slots are closed and the outer shape of the expansion sleeve is returned to its basically cylindrical form by the radially inward pressing of the tab located between the slots.

In the method of the present invention the slots can be formed in a known way by machining. Due to the radially pressing together of the tabs remaining between the axially extending slots, even wide slots are closed in an adequate manner, so that a surface of the expansion sleeve affording high anchoring values is achieved. An incompletely closed section at the end of the axially extending slot formed in this manner has no significant effect upon the anchoring value.

Instead of machining the axial extending slots, additional advantages are gained in the inventive method if the slots are produced by extrusion. Such a procedure assures an uninterrupted run of the fibers affording retention of high strengths.

Preferably, the axially extending slots are formed by pressing a male die into the axially extending expansion sleeve blank having a cylindrically shaped inside and outside surface, the material displaced by axially extending ribs flows outwardly so that the expansion sleeve has an increased length. In a following step the expansion region containing the axially extending slots is widened toward the leading end of the dowel. Subsequently, the outside surface of the expansion sleeve is returned to its initial cylindrical shape. In this operation, the widened expansion region is pressed radially inwardly so that the spacing between the tabs located between the axially extending slots is eliminated. Accordingly, a section of the bore is obtained tapering inwardly toward the leading end in the step of radially inwardly pressing the expansion region.

The axially extending slots can also be formed by shearing, however, such an operation does not afford any flow of the material and the course of the fibers in the expansion region is interrupted. Another characteristic of the invention obtained in forming the expansion sleeve of an expansion dowel involves, in addition to the axially extending slots, a partial section of the bore tapering inwardly to the leading end of the sleeve, so that high anchoring values can be obtained. This characteristic is obtained by providing the axially extending slots free of any lateral spacing between the tabs formed by the slots for at least a portion of the length of the slots.

As used herein, the expression free of any spacing between the sides of the axially extending slots, that is between the tabs formed between the slots, means that a considerable length of the slots is closed. If extrusion is used in the inventive method for forming the expansion region of the sleeve, it is possible to provide the entire length of the axially extending slots free of any spacing between the tabs formed between the slots. If the slots are formed by the chip-removing machining operation, such as a milling cutter, a part at the end of the slots may not be completely closed in the steps of radially pressing the tabs together. Since the portion of the slots which is not completely closed in relation to the remaining closed length of the slots is relatively short, there is no negative effect on the anchoring values achieved.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 2 is a schematic representation of an extrusion process used in the formation of the axially extending slots and illustrated partly in section.

DETAILED DESCRIPTION OF THE INVENTION

Figure 1:
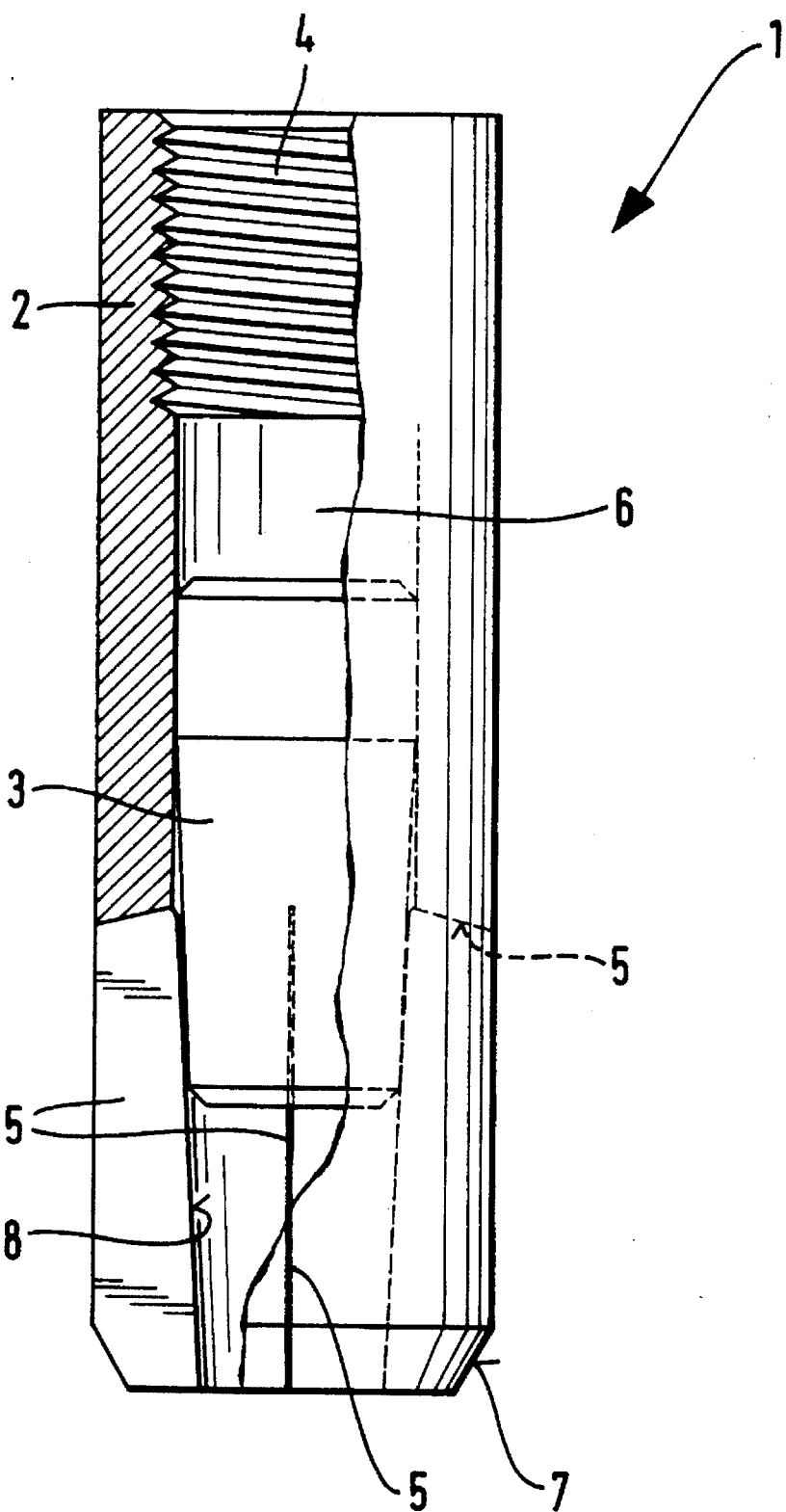
FIG. 1 is an elevational view, partly in section, of an expansion dowel embodying the present invention.

In FIG. 1 an expansion dowel 1 is illustrated formed of an axially extending expansion sleeve 2 with a cylindrically shaped outside surface and an expansion member 3. As viewed in FIG. 1 the lower end of the sleeve 2 is its leading end and the upper end is its trailing end, in other words, when used in a bore in a foundation the leading end is inserted first into the bore. Expansion sleeve 2 has an axially extending radially widenable expansion region 8 with four axially extending slots 5 with tabs located between the slots with the axially extending edges of the tabs being in contacting relationship, so that the slots do not form any gaps. The slots 5 are spaced uniformly around the circumference of the expansion sleeve. Expansion sleeve 2 has a load engagement means in the form of an inside thread 4 at its trailing end and in spaced relation from the expansion region 8. The axially extending slots open to the leading end of the sleeve and extend axially for at least a portion of the axial length of the sleeve 2. The sleeve has a central bore 6 extending between the leading end and the trailing end and the surface of the bore in the expansion region tapers inwardly toward the leading end in a conically-shaped manner. In other words, the bore tapers inwardly in the axially extending region 8 of the expansion slot 5. The expansion member 3 is located within the bore and at its leading end is at least partially cone-shaped corresponding to the cone-shaped section of the bore. The outside surface of the expansion sleeve 2 is substantially smooth and has a circumferentially extending chamfer 7 at the leading end.

FIG. 2 is a schematic illustration of the method of forming the axially extending slots 28, 38 of the expansion sleeves 10, 20, 30 in an extrusion operation. The steps of the method are designated as stations 1, 2, 3 and only the portions of the inventive method involving the expansion sleeve 10, 20, 30 are displayed which are involved in the formation of the axially extending slots 28, 38.

The steps of shaping an expansion sleeve blank into the inventive expansion sleeve involves female extrusion dies 11, 21, 31 and pressing rams 12, 13, 22, 23, 32, 33 insertable into the female extrusion dies. The female extrusions dies 11, 21, 31 are guided and held in a receiving member 9. Upper top guides 14, 24, 34 are located on the upper side of the receiving member 9 and guides 15, 25, 35 are located on the lower side of the receiving member for guiding the pressing rams 13, 23, 33. The upper pressing guides 12, 22, 32 are axially displaceable in the upper guides 14, 24, 34. The lower guides 15, 25, 35 are axially displaceable for directing the lower pressing rams 13, 23, 33 into the female extrusion dies 11, 21, 31.

Female extrusion die 11 at station 1 has a central cylindrically-shaped receiving bore 17 in which an expansion sleeve blank 10 is positioned so that its trailing end rests against the end face 12a of the upper pressing ram 12 extending partly into the receiving bore 17. The lower pressing ram 13 is driven into the leading end of the expansion sleeve 10 and the ram 13 has radially outwardly projecting and axially extending ribs 18 on its outside surface. When the pressing ram 13 is driven into the expansion sleeve blank 10, its axially extending ribs 18 form axially extending slots, not shown, in the expansion sleeve blank 10. Material displaced in this extrusion step flows outwardly providing an increased length of the expansion sleeve blank 10. The axially extending slots divide the axially extending expansion region 16 into individual tabs.

The next step of the method takes place at station 2 and is formed on the expansion sleeve 20. As inserted into the female extrusion die 21, the expansion sleeve 20 has a cylindrically-shaped outside surface and is supported within a receiving bore 27 in the female extrusion die 21 and is conically widened as the pressing ram 23 is forced into the bore 27 by the guide 25 due to the conically widened section 26 of the receiving bore 27. In station 2 the trailing end of the expansion sleeve 20 bears against the end face 22a of the upper pressing ram 22 which extends partly into the upper end of the receiving bore 27.

At station 2 the end of the lower pressing ran 23 is conically-shaped conforming to the conical shape of the lower end of the bore 27. As the lower pressing die 23 is forced into the lower end of the receiving bore 27 the lower or leading end of the expansion sleeve 20 is compressed and the tabs 29 located between the slots 28 are compressed so that the material forming the tabs flows outwardly into the conically-shaped widened region of the receiving bore 27. As a result, the expansion sleeve 20 experiences an axial shortening and conical widening of the expansion region 28 due to the pressing action of the ram 23.

Another step of the method is carried out at station 3. The expansion sleeve 20 formed at station 2 is now identified as expansion sleeve 30 in station 3 and is pressed into the female die 31 by the lower pressing ram 33 with the die 31 having a cylindrically-shaped receiving bore 37. In this step of the method, the previously widened expansion region 26 is compressed radially inwardly affording a substantially cylindrically-shaped outside surface for the expansion sleeve 30. The bore in the expansion sleeve has an axially extending section in the expansion region provided with a conically-shaped surface tapering inwardly towards the leading end of the sleeve. In the end position shown at station 3 within the receiving bore 37 of the female die 31, the trailing end of the expansion sleeve bears against the end face 32a of the upper pressing ram 32 projecting partly into the receiving bore 37. The axially extending slots 38, previously formed in the extrusion step at station 1 are pressed together, so that there is no gap formed between the adjacent tabs 39 when the leading expansion region is pressed inwardly within the receiving bore 37. In station 3 the width of the axially extending slots 38 is in the range of 0 to 0.2 mm.

The deformation of the expansion sleeve 2, 10, 20, 30 can be effected by cold extrusion or semi-cold extrusion at temperatures in the range of 200° to 300° C.

While a specific embodiment of the invention has been shown and described in detail to illustrate the inventive principles, it will be understood that the invention may be embodied otherwise without departing from said principles.

I claim:

1. Method of forming an axially extending sleeve (2, 10, 20, 30) for an expansion dowel (1) from an axially extending expansion sleeve blank having a cylindrically shaped inside and outside surface wherein said sleeve has a leading end and a trailing end, an axially extending expansion section (8, 16, 26, 36) with axially extending slots (5, 28, 38) and an axially extending bore (6, 39) extending between said leading and trailing ends and tapering inwardly toward said leading end at least in said expansion section, wherein the method comprises the steps of forming axially extending slots from said leading end in said axially extending expansion section whereby axially extending tabs are formed between the slots with the axially extending sides of the tabs disposed in spaced relation, and radially pressing the tabs together for closing the slots with the sides of the tabs in substantially contacting relation, and after forming the axially extending slots, widening the outside surface of the expansion section of the expansion sleeve and pressing the widened outside surface radially inwardly for providing the outside surface with a substantially cylindrical shape and pressing the tabs together for eliminating any spacing between the tabs in the region of the axially extending slots (5,28, 38).

2. Method, as set forth in claim 1, wherein forming the axially extending slots by extrusion.

3. Method, as set forth in claim 2, wherein inserting a pressing die with axially extending ribs (18) in an outer surface thereof into the expansion sleeve for forming the axially extending slots (5, 28, 38) by extrusion.

4. Method of forming an axially extending sleeve (2, 10, 20, 30) for an expansion dowel (1) wherein said sleeve has a leading end and a trailing end, an axially extending expansion section (8, 16, 26, 36) with axially extending slots (5, 28, 38) and an axially extending bore (6, 39) extending between said leading and trailing ends and tapering inwardly toward said leading end at least in said expansion section, wherein the method comprises the steps of laterally supporting an axially extending expansion sleeve blank having a leading end and a trailing end for the axial length thereof, inserting an axially extending ram with axially extending ribs in the outside surface thereof into the leading end of said sleeve blank and pressing said ram towards the trailing end and forming axially extending slots extending from the leading end to a location spaced between the leading end and trailing end with axially extending tabs located between said slots and with the tabs having axially extending sides with adjacent sides disposed in spaced relation, next placing the sleeve blank with the slots into an axially extending bore having an axially extending cylindrical section and an axially extending outwardly tapering conical section with the slots of the sleeve blank located in the conical section, pressing the slotted section radially outwardly and forming the slotted section of the sleeve blank with a conically-shaped outside surface tapering outwardly towards the leading end thereof, next inserting the sleeve blank with the slot and the outwardly tapering conical surface into a cylindrically-shaped bore and pressing the leading end of the sleeve blank into the cylindrically-shaped bore and deforming the outwardly tapering conical surface of the sleeve blank radially inwardly and closing the slots between the tabs and forming the sleeve blank into the expansion sleeve with a cylindrically-shaped outside surface and with a conically-shaped inside surface in the region of the slots tapering inwardly towards the leading end.

5. Method, as set forth in claim 4, wherein the spacing between the axially extending sides of said tabs is in the range of 0 to 0.2 mm.

* * * * *